US009234081B2

(12) United States Patent
Basfar et al.

(10) Patent No.: US 9,234,081 B2
(45) Date of Patent: *Jan. 12, 2016

(54) METHOD OF MANUFACTURING A NITRO BLUE TETRAZOLIUM AND POLYVINYL BUTYRAL BASED DOSIMETER FILM

(75) Inventors: Ahmed Ali Basfar, Riyadh (SA); Khalid Ahmed Rabaeh, Zarqa (JO); Akram Ahmed Al-Moussa, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 12 days.

This patent is subject to a terminal disclaimer.

(21) Appl. No.: 12/795,667

(22) Filed: Jun. 8, 2010

(65) Prior Publication Data

US 2011/0300360 A1 Dec. 8, 2011

(51) Int. Cl.
| | | |
|---|---|---|
| *B32B 5/00* | (2006.01) | |
| *B05D 3/02* | (2006.01) | |
| *C08K 5/3472* | (2006.01) | |
| *G01J 3/42* | (2006.01) | |
| *G01N 17/00* | (2006.01) | |
| *C08J 5/18* | (2006.01) | |
| *C08J 3/215* | (2006.01) | |
| *G01T 1/04* | (2006.01) | |

(52) U.S. Cl.
CPC .. *C08J 5/18* (2013.01); *C08J 3/215* (2013.01); *C08K 5/3472* (2013.01); *G01T 1/04* (2013.01); *C08J 2329/14* (2013.01); *Y10T 428/269* (2015.01)

(58) Field of Classification Search
CPC .......... C08J 3/215; C08J 5/18; C08K 5/3472; C08L 29/14; G01T 1/04
USPC ........ 427/385.5; 428/220, 339; 524/106, 376, 524/379, 557; 522/75
See application file for complete search history.

(56) References Cited

U.S. PATENT DOCUMENTS

| | | | |
|---|---|---|---|
| 3,476,578 A * | 11/1969 | Brinckman | 430/203 |
| 3,514,310 A | 5/1970 | Kimura et al. | |
| 3,609,093 A | 9/1971 | Harrah | |
| 3,640,821 A | 2/1972 | Fischer et al. | |
| 3,787,687 A * | 1/1974 | Trumble | 250/474.1 |
| 3,789,425 A | 1/1974 | Matsushima | |
| 3,792,481 A | 2/1974 | Nagashima et al. | |
| 3,819,516 A | 6/1974 | Bailey et al. | |
| 3,855,928 A | 12/1974 | Kinney et al. | |
| 3,887,374 A * | 6/1975 | Brongo et al. | 430/147 |
| 3,936,361 A * | 2/1976 | Takatori et al. | 205/52 |
| 4,012,292 A * | 3/1977 | Fujiwara et al. | 205/56 |
| 4,021,135 A | 5/1977 | Pedersen et al. | |
| 4,075,500 A | 2/1978 | Oman et al. | |
| 4,106,939 A | 8/1978 | Chang et al. | |
| 4,199,615 A | 4/1980 | Wacks et al. | |
| 4,256,435 A | 3/1981 | Eckel | |
| 4,285,481 A | 8/1981 | Biscomb | |
| 4,382,865 A | 5/1983 | Sweeny | |
| 4,457,666 A | 7/1984 | Selman, Jr. | |
| 4,482,290 A | 11/1984 | Foreman et al. | |
| 4,488,158 A | 12/1984 | Wirnowski | |
| 4,569,769 A | 2/1986 | Walton et al. | |
| 4,585,753 A | 4/1986 | Scott et al. | |
| 4,591,443 A | 5/1986 | Brown et al. | |
| 4,684,316 A | 8/1987 | Karlsson | |
| 5,098,806 A | 3/1992 | Robillard | |
| 5,232,484 A | 8/1993 | Pignatello | |
| 5,364,645 A | 11/1994 | Lagunas-Solar et al. | |
| 5,447,639 A | 9/1995 | Sivavec | |
| 5,618,427 A | 4/1997 | Seech et al. | |
| 5,663,475 A | 9/1997 | Elgal | |
| 5,702,587 A | 12/1997 | Clifford et al. | |
| 5,716,528 A | 2/1998 | Jasim et al. | |
| 6,160,194 A | 12/2000 | Pignatello | |

(Continued)

FOREIGN PATENT DOCUMENTS

| | | | |
|---|---|---|---|
| CN | 102823783 | A | 12/2012 |
| EP | 2360699 | A2 | 8/2011 |
| WO | 0029070 | A1 | 5/2000 |
| WO | 2004017095 | A2 | 2/2004 |
| WO | 2004077097 | A2 | 9/2004 |
| WO | 2004079393 | A2 | 9/2004 |
| WO | 2006065248 | A2 | 6/2006 |
| WO | 2009119942 | A1 | 10/2009 |
| WO | 2009130730 | A1 | 10/2009 |
| WO | 2012026840 | A1 | 3/2012 |
| WO | 2012154965 | A1 | 11/2012 |
| WO | 2012159012 | A1 | 11/2012 |
| WO | 2013095178 | A1 | 6/2013 |
| WO | 2013106277 | A1 | 7/2013 |

OTHER PUBLICATIONS

A.K. Pikaev and Z.K. Kriminskaya, Use of tetrazolium salts in dosimetry of ionizing radiation, Radiation Physics and Chemistry, vol. 52, Issues 1-6, Jun. 1998, pp. 555-561, ISSN 0969-806X.*

(Continued)

*Primary Examiner* — Fred M Teskin
*Assistant Examiner* — Marie Reddick
(74) *Attorney, Agent, or Firm* — Raj Abhyanker, P.C.

(57) ABSTRACT

NBT-PVA film dosimeters performance is affected due to high humidity levels. NBT-PVB film dosimeters with a relatively small effect of high humidity levels on its performance are invented. NBT-PVB film dosimeters are made by using alcoholic solution to dissolve both of NBT and PVB. The films are very useful for routine dosimeter in industrial radiation processing. A very high sensitivity NBT-PVB Radiochromic film dosimeter is achieved due to high solubility of NBT dye in 2-methoxyethanol enabling the addition of very high concentrations of NBT dye in the film dosimeters. The dose response of conventional NBT-PVA dosimeter films are normally saturated after 50 kGy, while the invented composites of NBT-PVB dosimeter films demonstrated high dose range up to 100 kGy for high dose industrial use.

3 Claims, 11 Drawing Sheets

(56) References Cited

U.S. PATENT DOCUMENTS

| | | | |
|---|---|---|---|
| 6,207,073 | B1 | 3/2001 | Wolfe et al. |
| 6,214,607 | B1 | 4/2001 | Logan |
| 6,621,086 | B1 | 9/2003 | Appleby |
| 7,098,463 | B2 | 8/2006 | Adamovics |
| 7,218,011 | B2 | 5/2007 | Hiel et al. |
| 7,476,874 | B2 | 1/2009 | Patel |
| 7,585,826 | B2 | 9/2009 | Hwu et al. |
| 7,750,317 | B2 | 7/2010 | Djouider et al. |
| 7,808,149 | B2 | 10/2010 | Pabst et al. |
| 7,928,594 | B2 | 4/2011 | Shreider et al. |
| 7,955,682 | B2 | 6/2011 | Gore |
| 8,089,173 | B2 | 1/2012 | Freda |
| 8,115,182 | B1 | 2/2012 | Patel |
| 8,137,052 | B1 | 3/2012 | Schlegel |
| 8,163,692 | B2 | 4/2012 | Awasthi et al. |
| 8,536,443 | B2 | 9/2013 | Li et al. |
| 8,586,665 | B2 | 11/2013 | Basfar et al. |
| 8,657,572 | B2 | 2/2014 | Presz, Jr. et al. |
| 8,794,903 | B2 | 8/2014 | Fedor et al. |
| 8,872,134 | B2 | 10/2014 | Patel |
| 2002/0028255 | A1 | 3/2002 | Colegate et al. |
| 2004/0211917 | A1 | 10/2004 | Adamovics |
| 2005/0002783 | A1 | 1/2005 | Hiel et al. |
| 2005/0208290 | A1 | 9/2005 | Patel |
| 2006/0145091 | A1 | 7/2006 | Patel |
| 2007/0281046 | A1 | 12/2007 | Wen et al. |
| 2008/0061559 | A1 | 3/2008 | Hirshberg |
| 2008/0124661 | A1 | 5/2008 | Gore |
| 2008/0150292 | A1 | 6/2008 | Fedor et al. |
| 2008/0176978 | A1 | 7/2008 | Nodera |
| 2009/0107919 | A1 | 4/2009 | Burba, III et al. |
| 2010/0090473 | A1 | 4/2010 | Glass |
| 2010/0168498 | A1 | 7/2010 | Burba, III et al. |
| 2010/0282302 | A1 | 11/2010 | Li et al. |
| 2011/0042952 | A1 | 2/2011 | Ohya et al. |
| 2011/0058937 | A1 | 3/2011 | Presz, Jr. et al. |
| 2011/0144244 | A1 | 6/2011 | Lee |
| 2011/0189006 | A1 | 8/2011 | Churchill et al. |
| 2011/0266802 | A1 | 11/2011 | Alvi |
| 2012/0057974 | A1 | 3/2012 | Freda |
| 2012/0086216 | A1 | 4/2012 | Ohya et al. |
| 2012/0104759 | A1 | 5/2012 | Ricker |
| 2012/0175882 | A1 | 7/2012 | Sterling et al. |
| 2012/0181453 | A1 | 7/2012 | Patel |
| 2012/0183387 | A1 | 7/2012 | Fedor et al. |
| 2012/0228963 | A1 | 9/2012 | Ursu et al. |
| 2012/0285893 | A1 | 11/2012 | Moore et al. |
| 2013/0178572 | A1 | 7/2013 | Ahmed et al. |
| 2014/0038305 | A1 | 2/2014 | Sharavara et al. |

OTHER PUBLICATIONS

Hossam M. Said et al, "Physical Properties of Electron Beam Irradiated Poly(vinyl butyral) Composites with Carbamate, Imidazole, and Tetrazolium Dye", Journal of Applied Polymer Science, vol. 101, Issue 6, Sep. 15, 2006 (pp. 4358-4365).*

"Oxidation of 2,4-dichlorophenoxyacetic acid by ionizing radiation: degradation, detoxification and mineralization", ScienceDirect, Feb. 2003 by Robert Zona et al. (p. 1) http://www.sciencedirect.com/science/article/pii/S0969806X02003304.

"Radiolytic degradation of malathion and lindane in aqueous solutions", Radiation Physics and Chemistry, vol. 78, Issue 11, Nov. 2009 by K. A. Mohamed et al. (p. 1) http://www.sciencedirect.com/science/article/pii/S0969806X0900245X.

"Gamma-ray induced degradation of diazinon and atrazine in natural groundwaters", Journal of Hazardous Materials, vol. 166, Issues 2-3, Jul. 2009 by K. A. Mohamed et al. (p. 1) http://www.sciencedirect.com/science/article/pii/S0304389408017846.

"Effects of ionizing radiation on pesticides in a food irradiation perspective: a bibliographic review", Journal of Agricultural and Food Chemistry, Dec. 1991 by Francois L. Lepine (p. 1) http://pubs.acs.org/doi/abs/10.1021/jf00012a002.

"Food irradiation studies at the Institute of Nuclear Energy Research, Taiwan, Rep. of China", Radiation Physics and Chemistry (1977),vol. 18, Issues 3-4, 1981 by Ying-Kai Fu et al. (p. 1) http://www.sciencedirect.com/science/article/pii/0146572481901758.

"Monitoring of toxicity during degradation of selected pesticides using ionizing radiation", Chemosphere, vol. 57, Issue 2, Oct. 2004 by Przemyslaw Drzewicz et al. (p. 1) http://www.sciencedirect.com/science/article/pii/S0045653504004060.

"Decomposotion of Aldrin by Gamma Radiation II. In Lipid Solutions", Jun. 1972 by A. E. Carp et al. (p. 2) http://link.springer.com/article/10.1007%2FBF01684456?LI=true#close.

"Using gamma irradiation for the recovery of anthocyanins from grape pomace", Radiation Physics and Chemistry, vol. 57, Issues 3-6, Mar. 2000 by N Ayed et al. (p. 1) http://www.sciencedirect.com/science/article/pii/S0969806X99003928.

"Studies on sprout inhibition of potatoes and onions and shelf-life extension of dates in Iraq", Radiation Physics and Chemistry vol. 14, Issues 3-6, 1979 by H. Auda et al. (p. 1) http://www.sciencedirect.com/science/article/pii/0146572479901134.

"Effect of gamma irradiation on storability of two cultivars of Syrian grapes (Vitis vinifera)", Radiation Physics and Chemistry, vol. 55, Issue 1, Jun. 1, 1999 by M. Al-Bachira (p. 1) http://www.sciencedirect.com/science/article/pii/S0969806X98002953.

"Use of tetrazolium salts in dosimetry of ionizing radiation", Radiation Physics and Chemistry, vol. 52, Issues 1-6, Jun. 1998 by A.K. Pikaev et al. (p. 1) http://www.sciencedirect.com/science/article/pii/S0969806X98000942.

"De-contamination of pesticide residues in food by ionizing radiation", Radiation Physics and Chemistry, vol. 81, Issue 4, Apr. 2012 by Ahmed A. Basfar et al. (p. 1) http://www.sciencedirect.com/science/article/pii/S0969806X11005226.

"Radiation induced degradation of dyes—An overview", Journal of Hazardous Materials, vol. 166, Issue 1, Jul. 15, 2009 by M.A. Rauf et al. (p. 1) http://www.sciencedirect.com/science/article/pii/S030438940801724X.

"Physical properties of electron beam irradiated poly(vinyl butyral) composites with carbamate, imidazole, and tetrazolium dye", Journal of Applied Polymer Science, vol. 101 Issue 6, Sep. 15, 2006 by Hossam M. Said et al. (pp. 3).

"Dosimetry characteristics of the nitro blue tetrazolium-polyvinylalcohol film for high dose applications", Radiation Physics and Chemistry, vol. 68, Issue 6, Dec. 2003 by A Moussa et al. (p. 1) http://www.sciencedirect.com/science/article/pii/S0969806X03005152.

"Polymer-based triphenyl tetrazolium chloride films for ultraviolet radiation monitoring", Radiation Physics and Chemistry, vol. 57, Issue 2, Feb. 2000 by S. Ebraheem et al. (p. 1) http://www.sciencedirect.com/science/article/pii/S0969806X99003527.

"A Shrouded Wind Turbine Generating High Output Power With Wind-lens Technology", energies 2010 by Yuji Ohya et al. (pp. 16).

* cited by examiner

Mono-tetrazolium

C-C ditetrazolium salt

N-N ditetrazolium salt

Reduction Process to Formazan

METHOD OF MANUFACTURING A NITRO BLUE TETRAZOLIUM AND POLYVINYL BUTYRAL BASED DOSIMETER FILM

FIELD OF INVENTION

The present invention relates to a method of making Radio chromic film which gives a permanent color change in two dimensions (2D) when exposed to ionizing radiation.

BACKGROUND

In radiation dosimetry there are numerous problems associated with the measurement of isodose curves and depth-dose distributions in high-gradient regions of beams using conventional measuring systems such as ionization chambers, semiconductors, thermoluminescent detectors (TLDs), and radiographic films. The evaluation of an ionizing photon beam is difficult by using silver-halide radiographic film, because of large differences in sensitivity to photon energies in the 10-200 keV region, even though its relatively high spatial resolution offers an advantage over most other radiation measuring systems. Energy absorption and transfer properties of radiographic films do not match those of biological tissues. Radiographic films also have the disadvantages of being sensitive to room light and requiring wet chemical processing.

The radiation sensitivity of the Radio-chromic Nylon Dosimetry Film System FWT-60-00 has been studied as a function of relative humidity of the air with which it is equilibrated. Data is presented for several temperatures and relative humidities of 20%-80%. The prior art results of the studies indicate a very low dependence on humidity over the range of 30% to 70% relative humidity with decreasing sensitivity at both lower and higher humidities.

Radiation dosimeters currently lack a high spatial resolution, absolute value of the absorbed dose, wet processing, environmental instability, and difficult data handling.

SUMMARY

A method and composition for a Radio-chromic film is disclosed.

In one embodiment the composition for a Radio-chromic film dosimeters containing nitro blue tetrazolium (NBT) is disclosed. NBT dyes are heterocyclic organic compounds, which upon irradiation yield highly colored water insoluble formazans due to radiolytic reduction of these compounds by hydrated electrons or hydroxyalkyl radicals.

In another embodiment when the films are exposed to radiation there is a color change in the NBT composition. Due to their colorless and transparent form, NBT films undergo a permanent color change after exposure to high irradiation dose.

In another embodiment the degree of coloration is measured and the results are read as the degree of coloration is directly proportional to the amount of absorbed dose, which may be read with a spectrophotometer or a simple photometer. These dosimeters demonstrated acceptable accuracy and precision with a relative ease of handling and data analysis.

In another embodiment a polyvinyl butyral (PVB) based NBT film dosimeters (NBT-PVB) where prepared using 2-methoxyethanol solvent to dissolve both of NBT dye and PVB powder and to form a new composite of NBT-PVB with different high concentrations of NBT dye. The films showed good performance for dose measurements as routine dosimeters in the dose range of 5-100 kGy by measuring the absorbance of the irradiated films. The effect of various concentrations of NBT dye on dose response of NBT-PVB was investigated. The dose sensitivity of the films increases strongly with increase of concentrations of NBT dye.

In further embodiment, a systematic evaluation of dosimetric properties of NBT-PVB dissolved in 2-methoxyethanol and their composite films were performed. It was found that it is useful for dosimeter functions in industrial radiation processing. The film demonstrated a high accuracy and precision with standard deviation values ($\sigma \leq 5\%$) and very good post irradiation stability with standard deviation values ($\sigma \leq 3\%$).

In another embodiment the response of the invented film increased fairly with increasing relative humidity and irradiation temperature.

These and other advantages, aspects and novel features of the present invention, as well as details of an illustrated embodiment thereof, will be more fully understood from the following description and figures.

DETAILED DESCRIPTION OF FIGURES

Figure 1:
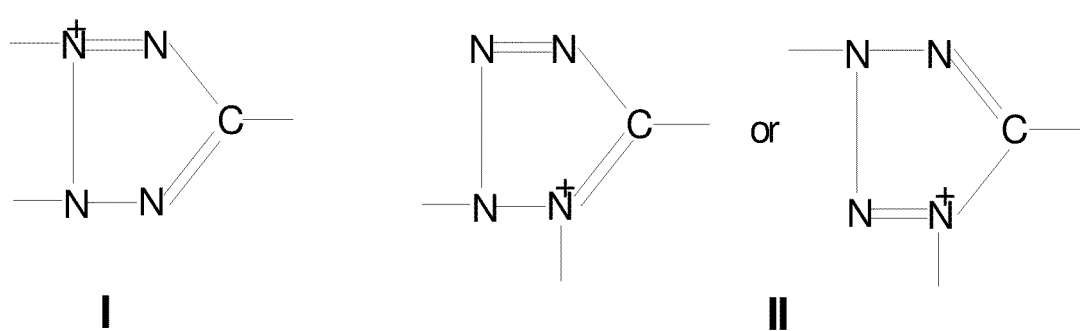
FIG. 1 Tetrazolium chemical structures.

FIG. 1 Tetrazolium chemical structures. Tetrazolium salts are quaternary derivatives of tetrazoles and therefore contain a ring of one carbon and four nitrogen atoms, one of which is quaternary. As a result, the compounds have salt-like properties.

Figure 2:
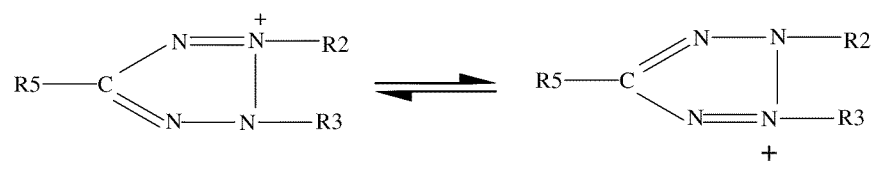
FIG. 2 Types of tetrazolium salts.
Figure 2:
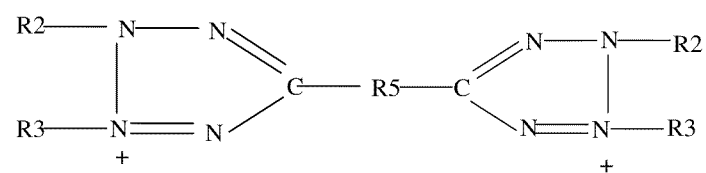
Figure 2:
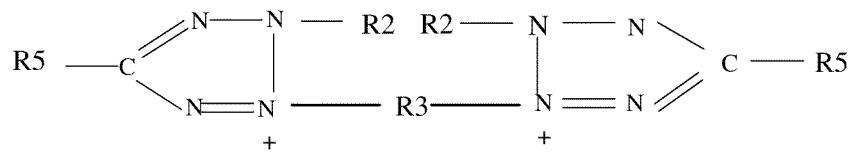

FIG. 2 Types of tetrazolium salts. Almost all the known tetrazolium salts (I) are derived from (2H) tetrazole, although the series (II) derived from (1H) tetrazole is theoretically possible. The vast majority of tetrazolium salts, which have been prepared, and all those, which have found biological applications, belong to the (2H) group. There are three types of tetrazolium salts, i.e. the mono-tetrazolium, the N—N di-tetrazolium and the C—C di-tetrazolium salts.

Figure 3:
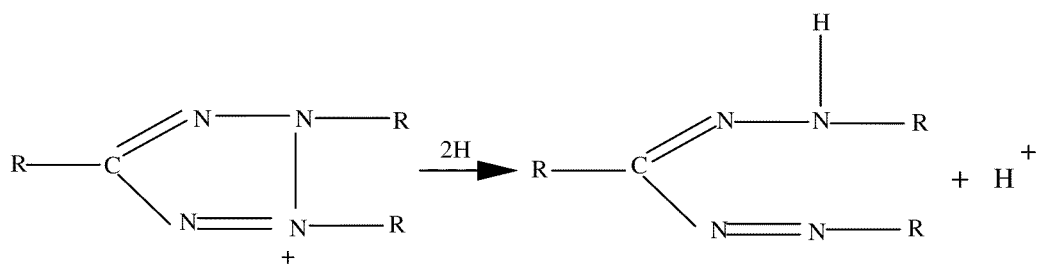
FIG. 3 Reduction of tetrazolium salt to formazan.

FIG. 3 Reduction of tetrazolium salt to formazan. Tetrazolium salts are stable compounds and somewhat soluble in water. Their solutions are colorless or very pale yellow and the reduction of these tetrazolium salts by hydrated electrons or hydroxyalkyl radicals results in a ring opening, and in the production of colored (e.g. pink, orange-red, or red, blue) compounds known as formazans which generally have low melting points, are sensitive to light, and are insoluble in water.

Figure 4:
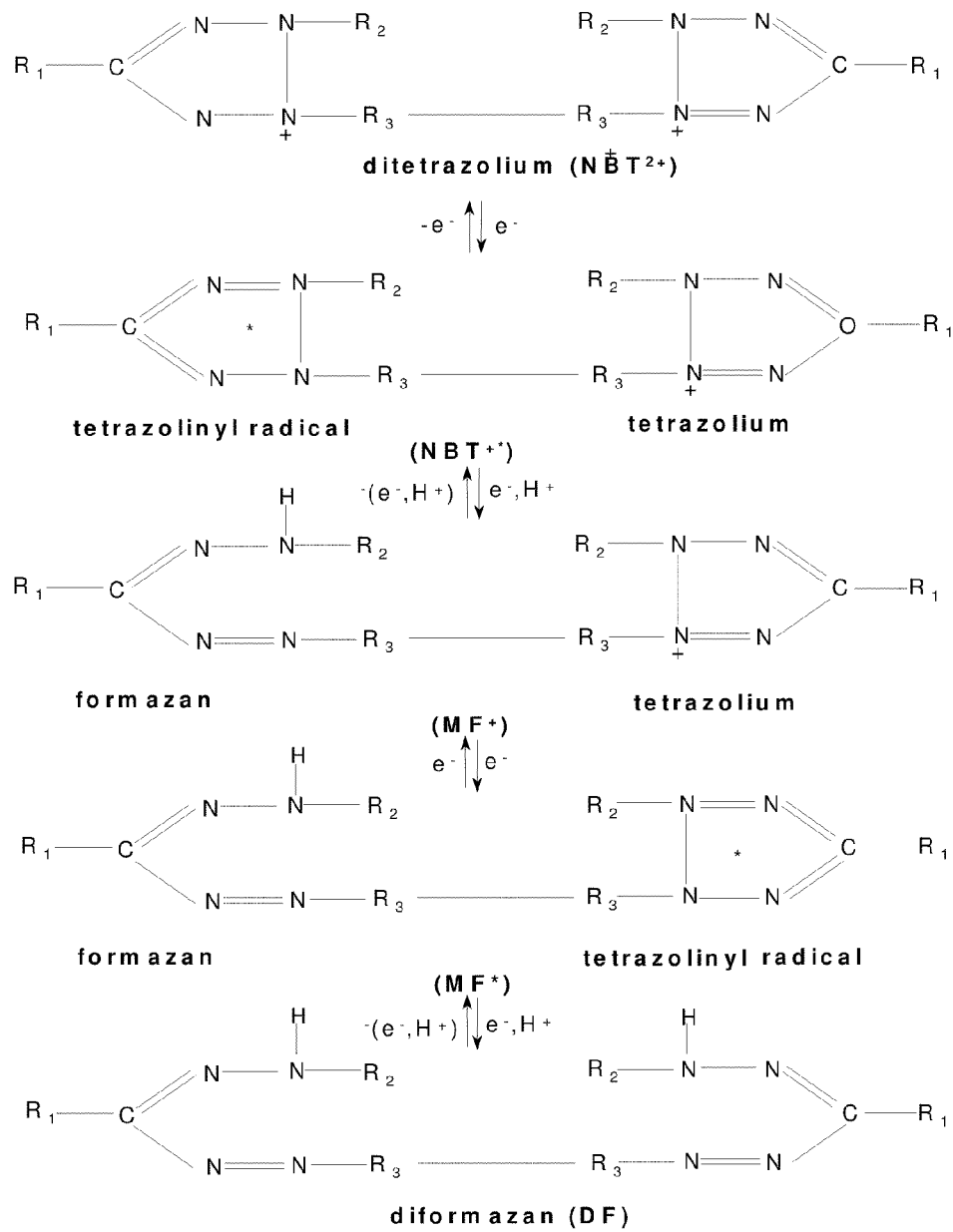
FIG. 4 Reduction of ditetrazolium
FIG. 5 Specific absorbance at 529 nm of 1, 2.5, and 5 mM NBT-PVB film dosimeter prepared in ethanol as a function of absorbed dose.

FIG. 4 Reduction of ditetrazolium. Nitro blue tetrazolium ($NBT^{2+}$) which has two tetrazolium connected with nitro groups. These nitro groups increase the reactivity of the compound towards reducing hydrated electrons and hydroxyalkyl radicals. Pulse and steady state radiolysis investigations of this compound have shown two-step formation of formazans, i.e. appearance of the violet colored mono-formazan followed by the formation of the blue di-formazan radiolysis product which only can be observed in steady state.

Figure 5:
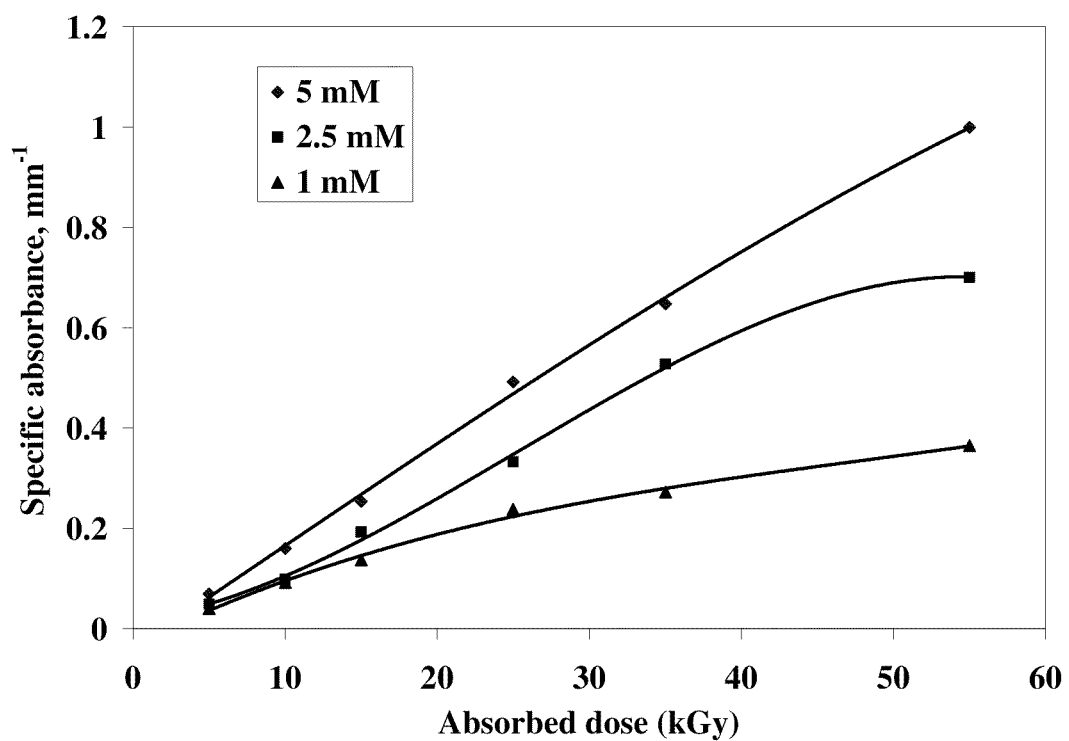

FIG. 5 Specific absorbance at 529 nm of 1, 2.5, and 5 mM NBT-PVB film dosimeter prepared in ethanol as a function of absorbed dose. The dose response of NBT-PVB film (Three film dosimeters were used for each irradiation dose) increases with increasing dose, which can be seen from an increase of the individual relative absorbance-dose curve. As the dose increases, more hydrated electrons and free radicals are generated leading to breakage of $N—N^+$ bonds, resulting in an increase in the formation of formazan. The results show that dose response increases with increasing dye concentration.

Figure 6:
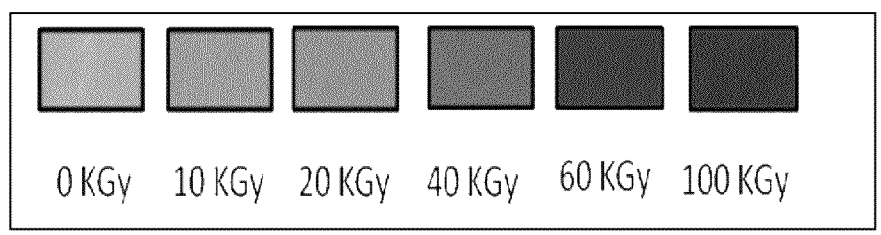
FIG. 6 Colour changes of NBT-PVB films at various absorbed doses.

FIG. 6 Colour changes of NBT-PVB films at various absorbed doses. The irradiated NBT-PVB films had undergone color change from yellow to brown after irradiation. As the dose increases, more hydrated electrons and free radicals are generated leading to the formation of colored formazan, resulting in an increase in the density of brown's color.

Figure 7:
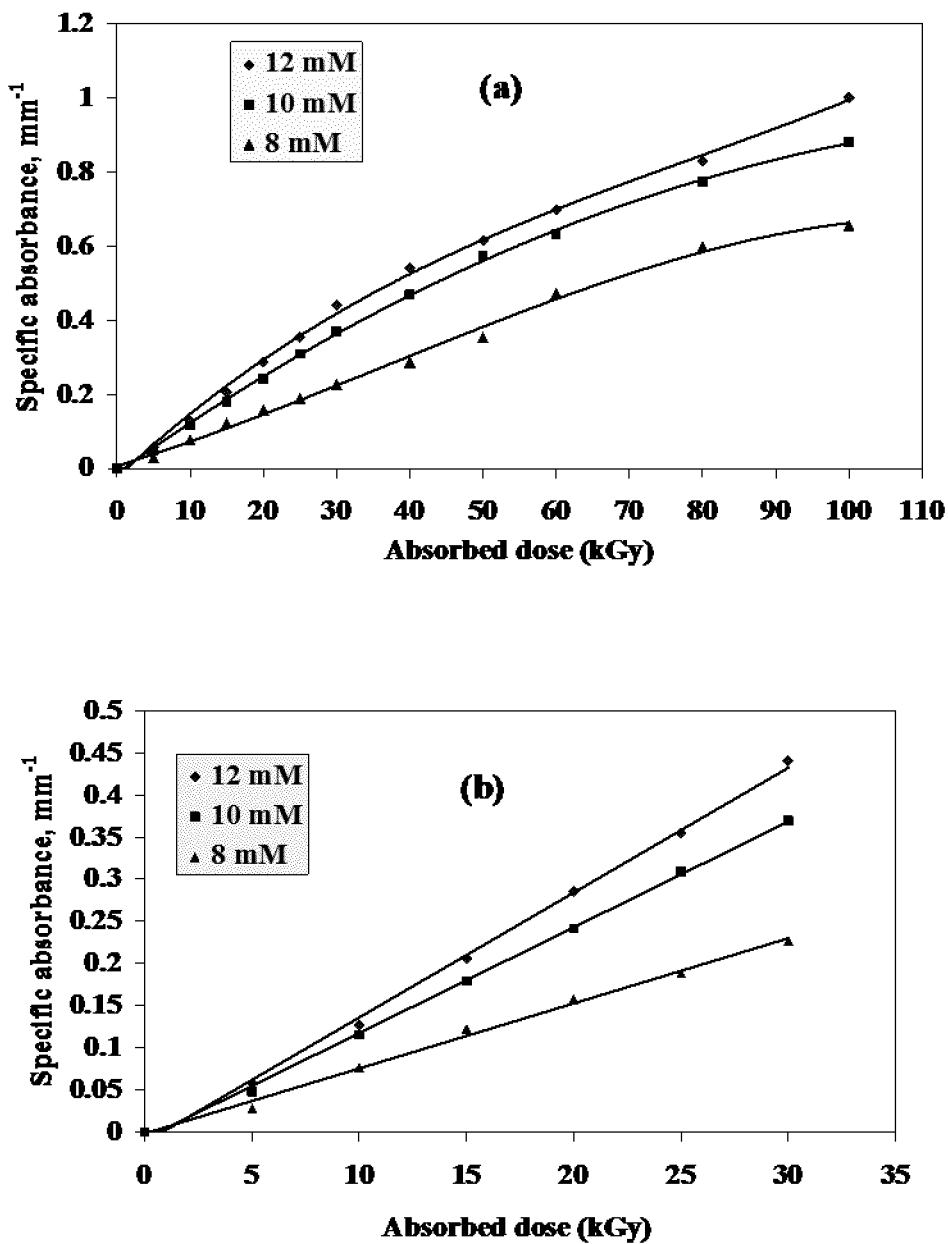
FIG. 7 Specific absorbance at 529 nm of 8, 10, and 12 mM NBT-PVB film dosimeters in the dose range (a) 5 to 100 kGy, (b) 5 to 30 kGy.

FIG. 7 Specific absorbance at 529 nm of 8, 10, and 12 mM NBT-PVB dosimeter film in the dose range (a) 5 to 100 kGy, (b) 5 to 30 kGy. The dose response of NBT-PVB film (Three film dosimeters were used for each irradiation dose) increases with increase of dose and concentrations of the NBT dye, which can be seen from an increase of the individual relative absorbance-dose curve (see FIG. 7(a)). The linearity response of the film extends up to 30 kGy (see FIG. 7(b)) which gives high quality response for this film.

Figure 8:
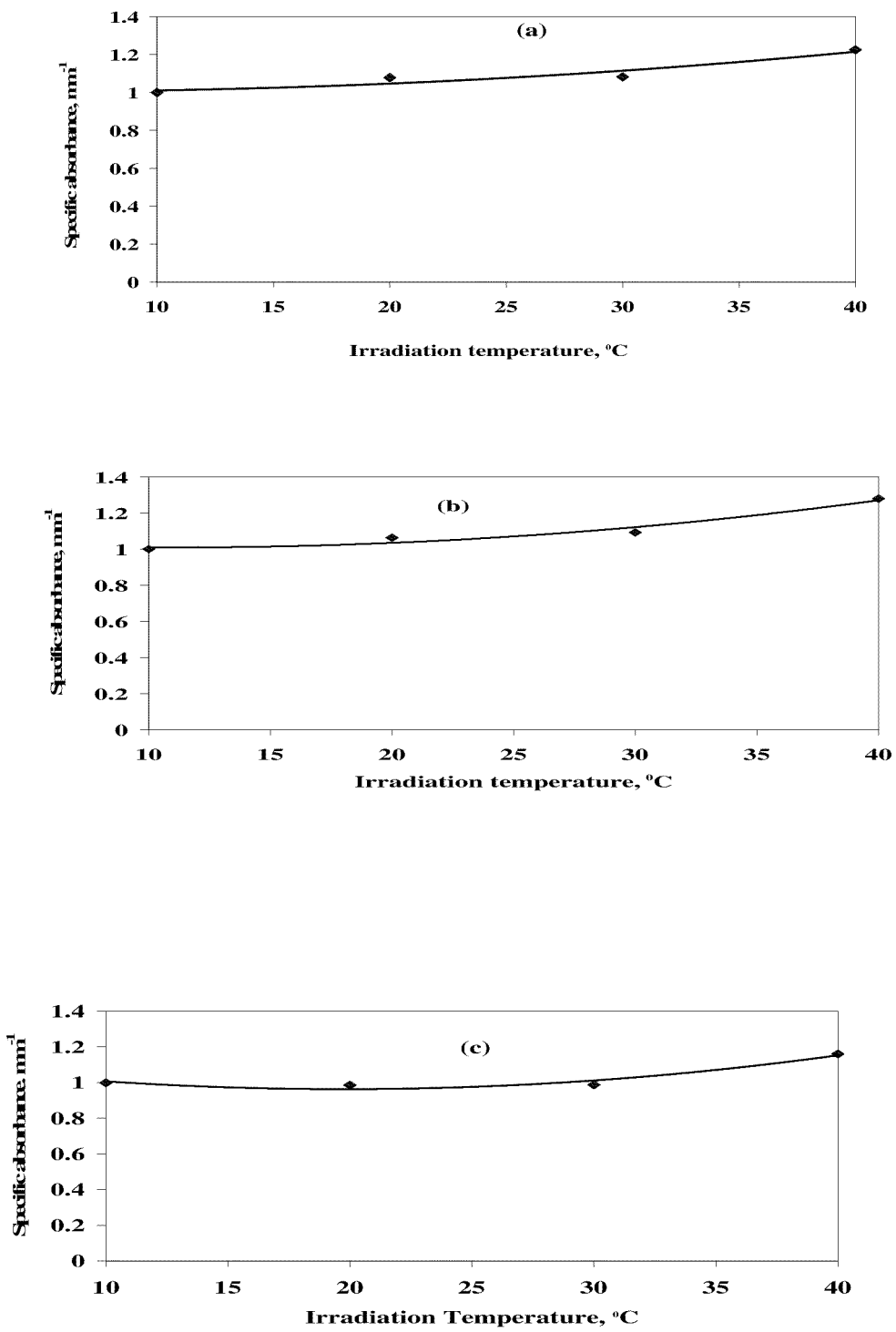
FIG. 8 Specific absorbance of 10 mM NBT-PVB film dosimeters normalized with respect to that at irradiation temperature of (a) 10° C. and (b) 20° C. as a function of irradiation temperature.

FIG. 8 Specific absorbance of 10 mM NBT-PVB film dosimeters normalized with respect to that at an irradiation temperature of 10° C. as a function of irradiation temperature for (a) 5 kGy, (b) 10 kGy and (c) 20 kGy. The variations in absorbance of the films (5, 10 and 20 kGy) were normalized with respect to that at irradiation temperature of 10° C. Three dosimeters were used for each irradiation dose. The results show that the dose response increases up to 40° C. Due to the dependence on irradiation temperature, the response of the films has to be corrected under actual processing conditions as most of commercial Radio-chromic dosimeters.

Figure 9:
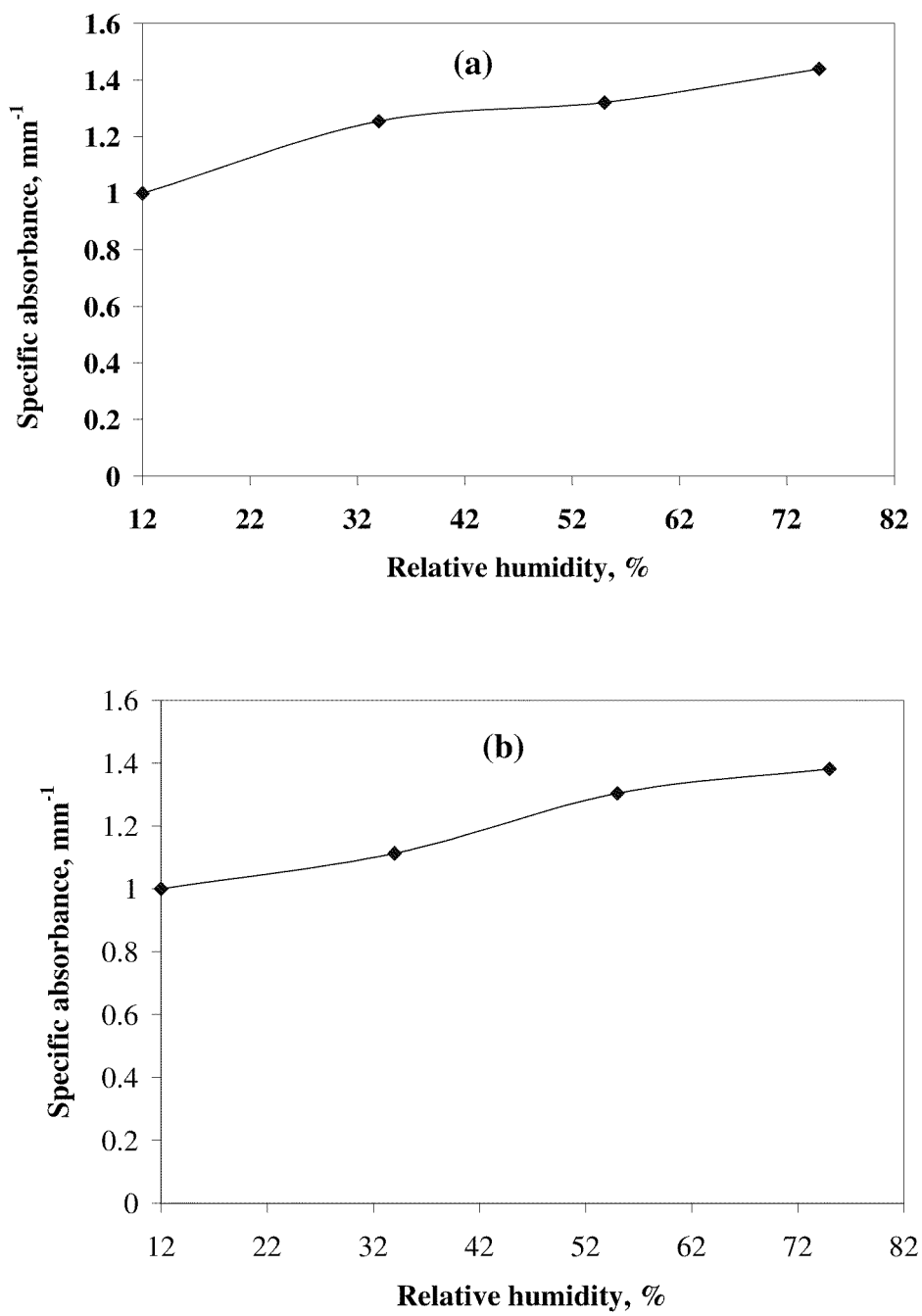
FIG. 9 Specific absorbance of 10 mM NBT-PVB film dosimeters normalized with respect to that at 12% relative humidity at (a) 10 kGy and (b) 20 kGy.

FIG. 9 Specific absorbance of 10 mM NBT-PVB film dosimeters normalized with respect to that at 12% relative humidity at (a) 10 kGy and (b) 20 kGy. The variations in absorbance of the irradiated films (10 and 20 kGy) were normalized with respect to that at 12% relative humidity. Three dosimeters were used for each irradiation dose. The results show that the dose response increases reasonably with increasing relative humidity compared to previous studies of NBT-PVA film dosimeters.

Figure 10:
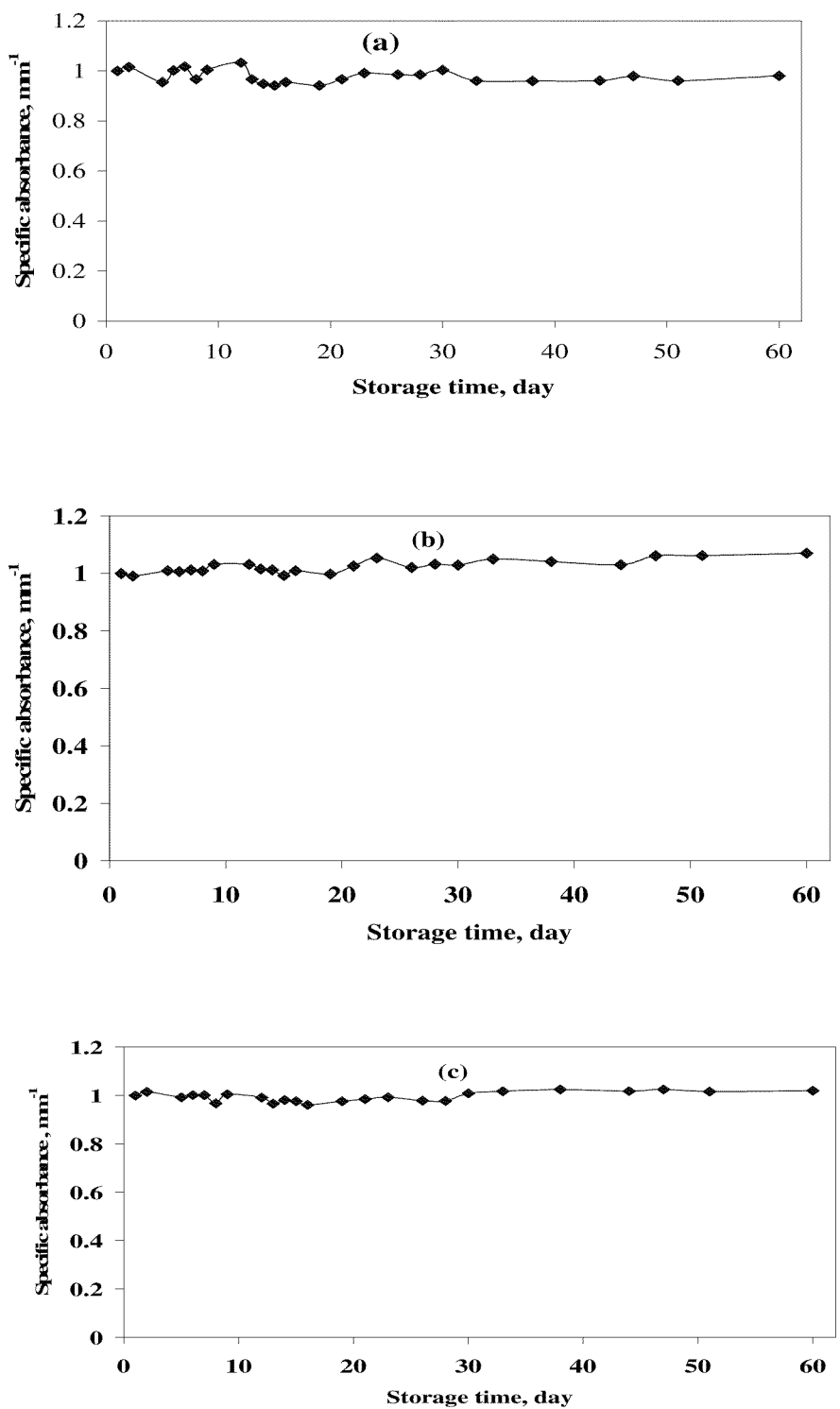
FIG. 10 Specific absorbance of 10 mM NBT-PVB film dosimeters normalized with respect to that at one day after irradiation for different absorbed doses (a) 10 kGy, (b) 20 kGy and (c) 30 kGy.

FIG. 10 Specific absorbance of 10 mM NBT-PVB film dosimeters normalized with respect to that at one day after irradiation for different absorbed doses (a) 10 kGy, (b) 20 kGy and (c) 30 kGy. The variations in absorbance of the irradiated films were normalized with respect to the first day after irradiation. Three dosimeters were used for each irradiation dose. The results show limited change (less than ±3%; 1σ) in the specific absorbance of the film up to 60 days indicating that this film has a potential for commercial application as Radiochromic film dosimeters.

Figure 11:
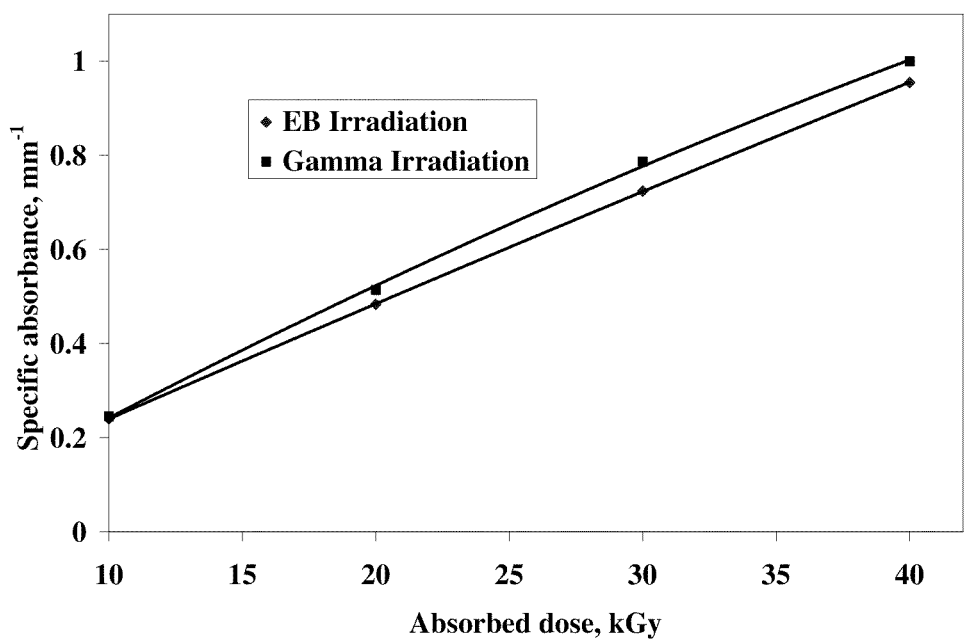
FIG. 11 Specific absorbance of 10 mM NBT-PVB film dosimeters irradiated with gamma ray and electron beam (EB) to different absorbed doses.

FIG. 11 Specific absorbance of 10 mM NBT-PVB film dosimeters irradiated with gamma ray and electron beam (EB) to different absorbed doses. The effect of dose rate on the invented film was investigated using 1.25 MeV gamma-ray from $^{60}$Co source at a mean dose rate of 11.98 kGy/h and an electron beam accelerator with energy of 10 MeV, mean dose rate of 1 kGy/s, relative humidity of 50% and at temperature of 25° C. for irradiation at absorbed doses of 10, 20, 30 and 40 kGy. Three dosimeters were used for each irradiation dose. It was found that there is no appreciable effect of dose rate on the irradiated film.

DETAILED DESCRIPTION

Example embodiments, as described below, may be used to provide several methods and process for making a dosimeter film. Although the present embodiments have been described with reference to specific example embodiments, it will be evident that various modifications and changes may be made to these embodiments without departing from the broader spirit and scope of the various embodiments.

There is a need for a radiation dosimeter with high spatial resolution which does not require a special developmental procedure and gives permanent absolute values of absorbed dose with an acceptable accuracy and precision and ease of handling and data analysis. Some of these features have been achieved with the introduction of radiochromic dosimeters. These dosimeters, with very high spatial resolution and relatively low spectral sensitivity variation, are insensitive to visible light, thus offering ease of handling and preparation in room light. Radiochromic dosimeters color directly and do not require chemical processing, a color change (colorless to blue, red, green, etc.) indicates exposure to radiation. Image formation occurs as a dye-forming or a polymerization process, in which energy is transferred from an energetic photon or particle to the receptive part of the leuko-dye or colorless photomonomer molecule, initiating color formation through chemical changes.

The energy imparted to matter by ionizing radiation per unit mass of irradiated material at the point of interest is called the 'absorbed dose' or dose and the unit is given in gray (Gy) or J/kg. The dose can be calculated by knowing the energy of the radiation and the composition of the medium, which then leads to the formation of dosimeters. A dosimeter is defined as a device that when irradiated, exhibits a quantifiable and reproducible change in physical or chemical property of the device which can be related to the dose in a given material using appropriate analytical techniques. Techniques for measuring radiation dose can be divided into the absolute and secondary methods (Spinks and Woods, 1990). The absolute method involves direct measurements of the radiation dose such as calorimeters and ionization chambers. The secondary method such as radio-chromatic dosimeter films, thermoluminescent dosimeters (TLD), ferrous sulfate (Fricke) dosimeters, and polymer gel dosimeters, involves indirect measurements whose response to radiation is taken from comparison with the absolute dosimeter.

Irradiation of water by high-energy electrons or gamma rays results in the formation of two reducing species, the aqueous electron $e^-_{aq}$, and the hydrogen atom, H., and one oxidizing species, the hydroxyl radical, .OH, according to Equation 1 (Spinks and Woods, 1990).

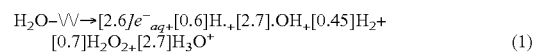
(1)

The number in brackets in Equation 1 is referred to as G values and are the number of radicals, molecules, or ions that are formed (or destroyed) in a solution absorbing 100 eV (energy). The effectiveness of this process in destroying organic compounds results from the rapid reaction of one or more of these species with the solute of interest.

The chemistry involved in the gamma radiolysis or electron beam processes in aqueous solutions and/or in food products is related to these three reactive species (i.e. $e^-_{aq}$, H. and .OH).

The major reaction in the water radiolysis involves the formation of $e^-_{aq}$, .OH and H. and in the presence of oxygen also $O_2.^-$, reactive intermediate, for example the reaction of $e^-_{aq}$ and H. with $O_2$ is rapid and results in the formation of the super oxide ion-hydroxyl radicals according to Equations 2 and 3 (Cooper J et al.).

$$e^-_{aq} + O_2 \rightarrow O_2.^- \quad (2)$$

$$H. + O_2 \rightarrow HO_2. \quad (3)$$

Radio-chromic effects involve the direct coloration of a media by the absorption of radiation, which does not require any latent thermal, optical or chemical development or amplification (Kosar, J., 1965).

Radiation induced photochemical reactions involve a unimolecular decomposition of the dye derivative, followed by an intra-molecular electron rearrangement to form the stable and deeply colored dye (Humphrey et al.). Other Radio-chromic effects include organic-free radical imaging medium which combines photo-polymerization with leuco dyes which produce color upon irradiation. This results in the pairing of free radicals to form radiation-induced cross-linked carbon chains which result in covalently bonded growing chains (Martin J. Butson, et al.). These molecules require a host material for film development, which normally consists of a styrene-, vinyl- or nylon-based polymer. However, these types of films require large doses to exhibit a distinguishable change in color, typically in the order of 104-106 Gy (Holm, N. W. et al.).

Tetrazolium salts have long been known as quaternary ammonium compounds with a significant property of forming water insoluble, highly colored formazans by reduction. Due to these characteristics and to their low reduction potentials, these compounds have been introduced as reagents for the detection and study of reducing enzyme systems and for the detection and estimation of reducing functions of organic compounds. They have also been used in botany as coloring compounds sensitive to UV radiation, to estimate the productivity of seeds of agricultural plants, to distinguish between normal and malignant tissues and as analytical reagents to detect $O_2.^-$ radical ions (Ali, M. B. et al.). The formation of the colored formazans can also be utilized for dosimetry of ionizing radiation. The chemical preparation of tetrazolium salts was carried out by the oxidation of the corresponding formazan, which compound was first prepared by Friese in 1875 (Gibon, Y. et al.), after that improvements in the synthesis of these compounds and the preparation of several new derivatives were reported (Bheusch, F. L. et al.). Recently numerous tetrazolium salts have been synthesized and their structural features have been investigated (Appleby, Alan, 2003).

In general, tetrazolium salts are quaternary derivatives of tetrazoles and therefore contain a ring of one carbon and four nitrogen atoms, one of which is quaternary. As a result, the compounds have salt-like properties. The chemical structures of tetrazolium are shown in FIG. 1.

Almost all the known tetrazolium salts (I) are derived from (2H) tetrazole, although the series (II) derived from (1H) tetrazole is theoretically possible. The vast majority of tetrazolium salts, which have been prepared, and all those, which have found biological applications, belong to the (2H) group.

There are three types of tetrazolium salts, i.e. the monotetrazolium, the N—N di-tetrazolium and the C—C di-tetrazolium salts as shown in FIG. 2.

Out of these three types of compounds, the mono-tetrazolium and the N—N di-tetrazolium salts are of greater importance because they are easy to prepare and used for an application.

Tetrazolium salts are stable compounds and somewhat soluble in water. Their solutions are colorless or very pale yellow and the reduction of these tetrazolium salts by hydrated electrons or hydroxyalkyl radicals results in a ring opening, and in the production of colored (e.g. pink, orange-red, or red, blue) compounds known as formazans (Kriminskaya, Z. K., et al.). The reduction of tetrazolium salt is as shown in FIG. 3.

Formazans generally have low melting points, are sensitive to light, and are soluble in organic solvents and lipids. One of the important tetrazolium salt is nitro blue tetrazolium ($NBT^{2+}$) which has two tetrazolium connected with nitro groups. These nitro groups increase the reactivity of the compound towards reducing hydrated electrons and hydroxyalkyl radicals. Pulse and steady state radiolysis investigations of this compound have shown two-step formation of formazans, i.e. appearance of the violet colored mono-formazan followed by the formation of the blue di-formazan radiolysis product which only can be observed in steady state as shown in FIG. 4 (Kovács, A., et al.).

Quality control of radiation processing depends strongly on film dosimeters, therefore many types of films are used for radiation dosimetry such as Radio-chromic films of various types (Kantz, A., 1979). Ionizing radiation induced reduction of tetrazolium salts polyvinyl alcohol (PVA) film dosimeters such as 2,3,5-Triphenyltetrazolium chloride TTC-PVA film dosimeter (Kovács, A., et al.), tetrazolium violet TV-PVA film dosimeter (Emi-Reynolds, G., et al.) and nitro blue tetrazolium chloride NBT-PVA film dosimeter (Kovács, A., et al.; Moussa, A., et al.), were investigated. It was found that NBT can be used as radiation dosimeter in the range between 5 to 50 kGy but, the major disadvantages of previous studies was the strong effect of high humidity environment (amount of water content during irradiation) on the performance of these dosimeters. Due to the different environmental conditions between calibration and practical use, this disadvantage leads to limitation of using these films as a routine dosimeter in gamma radiation processing.

Nitro blue tetrazolium chloride polyvinyl butyral film are produced for withstanding high humid conditions. A method of making and using NBT-PVB film dosimeter is descirbed in this invention. PVB is a resin usually used for applications that require strong binding, optical clarity, and flexibility. PVB does not dissolve in water, so it is sensitive to humidity. Therefore, the stock solutions of NBT dye were prepared by dissolving different weights of NBT (product of Biosynth, USA) in 200 ml ethanol in a 250 ml volumetric flask as presented in Table 1.

TABLE 1

Various concentrations of NBT dye solution.

| Stock Solution No. | Concentration (mM) |
|---|---|
| 1 | 5 |
| 2 | 2 |
| 3 | 1 |

The solution was stirred at room temperature for 3 hours to ensure homogenous dye stock solutions.

Polyvinyl butyral (PVB) solutions were prepared by dissolving 18 g PVB powder (Mw=36,000 g/M, Wacker Chemicals, USA) in 180 ml ethanol at temperature of 60° C. The solution was magnetically stirred at this temperature for 4 hours and then left to cool to room temperature. After cooling to room temperature, PVB solution was divided into 60 ml samples. Then, different concentrations of nitro blue tetrazolium, i.e. 1, 2.5, and 5 mM were added to 60 ml PVB solution. Mixtures were stirred continuously for 24 hours using a magnetic stirrer in order to obtain a uniformly dyed PVB solution. NBT-PVB solutions were poured onto a highly levelled horizontal polystyrene (PS) plates and dried at room temperature for about 72 hours. Films were peeled off and cut into 1×3 cm pieces, dried, stored and prepared for irradiation. The drying is completed when the weight of the films is constant. The films were protected from sunlight, fluorescent light, moisture and dust by storing them in paper envelope and wrapping them with black plastic tape.

Dyed PVB films were irradiated with 1.25 MeV gamma-ray from $^{60}$Co source Model GC-220 supplied by MDS Nordion, Canada at a mean dose rate of 11.98 kGy/h which is connected to an air chiller system, Turbo-Jet (Kinetics, USA) in order to monitor the temperature during irrdiation. The dose rate of the source was calibrated using ferrous sulphate (Fricke) dosimeter (ASTM Standard Practice E1026, 1997 and 1998). Irradiations were conducted at various temperatures as needed.

Three films were measured for each irradiation dose and the average is reported, no significant differences in their characteristics were found during measurements.

A range of 12-75% relative humidity levels were used to study the effect of humidity on the performance of NBT-PVB film dosimeters during irradiation. These humidity levels were achieved using the following saturated salt solutions: LiCl (12%), $MgCl_2 \times 6H_2O$ (34%), $Mg(NO_3)_2 \times 6H_2O$ (55%) and NaCl (75%) according to the technique devised by (Levine, H., et al.) The films irradiated in a given humidity environment were kept in the same environment for 3 days before irradiation to achieve a suitable equilibrium.

UV/VIS spectrophotometer is used to measure the absorbance of spectra of radiation in the near infrared (700-1100 nm), visible (350-700 nm) and ultra violet (190-350) nm regions. The absorption spectra of irradiated NBT films in the wavelength range from 350-650 nm were measured using UV/VIS spectrophotometer, model Lambda 20, from Perkin-Elmer, USA. Three films at each absorbed dose were measured and the average is reported Dose response of NBT-PVB films made using ethanol is shown in both Table 2 and FIG. 5.

TABLE 2

Absorbance of NBT-PVB film with absorbed dose

| Absorbed dose | Absorbance (a.u.) | | |
|---|---|---|---|
| (kGy) | 5 mM | 2.5 mM | 1 mM |
| 5 | 0.069918101 | 0.049003 | 0.040358 |
| 10 | 0.160695736 | 0.09855 | 0.092267 |
| 15 | 0.253929054 | 0.19286 | 0.137325 |
| 25 | 0.492408456 | 0.332964 | 0.2381 |
| 35 | 0.647997086 | 0.527331 | 0.27232 |
| 55 | 1.000002906 | 0.700747 | 0.365118 |

The low homogeneity of solutions especially at concentrations more than 1 mM NBT dye and large thicknesses (more than 200 µm) in the films prepared in ethanol forced us to search for another alcoholic solvent to improve the quality and sensitivity of the film. 2-methoxyethanol solvent was used as a substitute because both NBT and PVB are highly soluble in this solvent.

Polyvinyl butyral (PVB) solutions were prepared by dissolving 9 g PVB powder (Mw=36,000 g/M, Wacker, USA) in 110 ml 2-methoxyethanol at 45° C. The solution was magnetically stirred at this temperature for 4 hours and then left to cool down to room temperature. After cooling down to room temperature, PVB solution was divided into three volumes. PVB composites were prepared by dissolving different concentrations of NBT (i.e. 8, 10, and 12 mM.) in the three volumes of PVB solutions, respectively. Mixtures were stirred continuously for 24 hours using a magnetic stirrer in order to obtain uniformly dyed PVB solutions. NBT-PVB solutions were poured onto a highly leveled horizontal glass plates and dried at room temperature for about 72 hours. Films were peeled off and cut into 1×3 cm pieces, dried, stored and prepared for irradiation. The drying is completed when the weight of the films is constant. The films were protected from sunlight, fluorescent light, moisture and dust by storing them in paper envelope and wrapping them with black plastic tape. The thickness of the film is 100±5 µm with very good homogeneity. Colour changes of NBT-PVB films at various absorbed doses are shown in see FIG. 6.

The effect of the dye concentrations on the response of the dosimeter films was investigated in different compositions of NBT-PVB films. A set of three films was used for each irradiation dose. The dose response curves were established in terms of change in absorption peak measured at 529 nm normalized to the thickness of the film. Dose response of NBT-PVB films over the ranges 0-100 kGy and 0-30 kGy is shown in FIG. 7 (a and b), respectively. Dose response of NBT-PVB films in 2-methoxyethanol over the range 5-30 kGy with accuracy and precision values are presented in Tables 2 and 3.

TABLE 2

Absorbance of NBT-PVB film with accuracy values.

| | Absorbance (a.u.) | | | |
|---|---|---|---|---|
| Film no. | 5 kGy | 10 kGy | 20 kGy | 30 kGy |
| 1 | 0.136911 | 0.30075 | 0.632486 | 1.032071 |
| 2 | 0.128845 | 0.301295 | 0.689318 | 0.94409 |
| 3 | 0.129962 | 0.318387 | 0.668381 | 1.023858 |
| Average | 0.131906 | 0.306811 | 0.663395 | 1.000000 |
| SD | 0.004371 | 0.010029 | 0.028742 | 0.048599 |
| Accuracy (%) | ±3.3 | ±3.2 | ±4.3 | ±4.9 |

TABLE 3

Absorbance of NBT-PVB film with precision values.

| | Absorbance (a.u.) | | | |
|---|---|---|---|---|
| Film no. | 5 kGy | 10 kGy | 20 kGy | 30 kGy |
| 1 | 0.141153 | 0.327709 | 0.674774 | 0.983116 |
| 2 | 0.13071 | 0.352094 | 0.697085 | 0.984372 |
| 3 | 0.139205 | 0.347282 | 0.728916 | 1.032474 |
| Average | 0.137023 | 0.342361 | 0.700258 | 1.0000 |
| SD | 0.005553 | 0.012916 | 0.02721 | 0.028141 |
| Precision (%) | ±4.0 | ±3.8 | ±3.9 | ±2.8 |

For all concentrations of NBT dye, the dose response of NBT-PVA film increases with increase of dose, which can be seen from an increase of the individual relative absorbance-dose curve (see FIG. 7(a)). As the dose increases, more hydrated electrons and free radicals are generated leading to breakage of N—N⁺ bonds, resulting in an increase in the formation of colored formazan. The results show that dose response increases with increase of dye concentration, indicating that NBT-PVB dosimeter films containing higher concentrations of the NBT dye are more suitable for high dose dosimetry. Previous studies such as (Bielski, B., et al., Sadeghi Ali, et al.) demonstrated that the dose response of their tetrazoluim salts dosimeter films was saturated after 50 kGy. This limited the use of the solutions for irradiation doses above 50 kGy. Therefore, the invented composites of NBT-PVB dosimeter films with high dose range have more potential for high dose applications. The results show that the linearity response extends up to 30 kGy (see FIG. 7(b)) which gives high quality response for this film. The results demonstrated that the absorbance values have a high accuracy and precision values with standard deviation values ($\sigma \leq 5\%$), indicating that these films possess a high degree of reliability for radiation processing industry.

The effect of irradiation temperature on response of NBT-PVB films was investigated by irradiating films containing 10 mM NBT dye to 10 kGy at 10, 20, 30 and 40° C. measured by a thermocouple (Model 54 Series II, Fluke Corporation, USA). A set of three films was used for each temperature. The variations in absorbance of the films were normalized with respect to that at irradiation temperature of 10 and 20° C., respectively (see FIG. 8(a and b)). The results show that the dose response increases up to 40° C. with a maximum variation of 27% (Table 4 and FIG. 8(a)) and 19% (FIG. 8(b)), respectively. Due to the dependence on irradiation temperature, the response of the films has to be corrected under actual processing conditions as most of commercial Radio-chromic dosimeters such as polymethylmethacrylate (PMMA) dosimeters (Whittaker, B. et al.), and radiochromic films, type MATT (Farah, et al.).

TABLE 4

Absorbance of NBT-PVB film with irradiation temperature.

| Irradiation Temperature | Absorbance (a.u.) | | | |
|---|---|---|---|---|
| (° C.) | Film No. 1 | Film No. 2 | Film No. 3 | Average |
| 10 | 0.956053 | 1.039108 | 1.014698 | 1 |
| 20 | 1.057011 | 1.109188 | 1.00595 | 1.057383 |
| 30 | 1.088297 | 1.089977 | 1.094475 | 1.090917 |
| 40 | 1.295542 | 1.271744 | 1.271744 | 1.279677 |

The effect of humidity on the NBT-PVB film dosimeters was investigated by storing film samples containing 10 mM NBT dye in vials in different humidity levels (12%, 34%, 55% and 74% relative humidity) for three days, then the films were irradiated in the same vials to 10 and 20 kGy. A set of three films was used for each irradiation dose. The variations in absorbance of the irradiated films (10 and 20 kGy) were normalized with respect to that at 12% relative humidity (see Tables 5 and 6 and FIG. 9 (a and b)). The results show that the dose response increases reasonably with increasing relative humidity compared to previous studies of NBT-PVA film dosimeters (Moussa, A., et al.; Emi-Reynolds, G., et al.).

TABLE 5

Absorbance of NBT-PVB film with relative humidity at 10 kGy.

| | Absorbance (a.u.) | | | |
|---|---|---|---|---|
| RH (%) | Film No. 1 | Film No. 2 | Film No. 3 | Average |
| 12 | 1.037037 | 0.987654 | 0.975309 | 1 |
| 34 | 1.185185 | 1.259259 | 1.320988 | 1.255144 |
| 55 | 1.320988 | 1.320988 | 1.320988 | 1.320988 |
| 75 | 1.444444 | 1.407407 | 1.45679 | 1.436214 |

TABLE 6

Absorbance of NBT-PVB film with relative humidity at 20 kGy.

| | Absorbance (a.u.) | | | |
|---|---|---|---|---|
| RH (%) | Film No. 1 | Film No. 2 | Film No. 3 | Average |
| 12 | 0.9904 | 0.98665 | 1.03144 | 1 |
| 34 | 1.12654 | 1.10166 | 1.11433 | 1.114177 |
| 55 | 1.29066 | 1.30155 | 1.320988 | 1.304399 |
| 75 | 1.381587 | 1.390134 | 1.37586 | 1.382527 |

Similar to other types of commercial Radio-chromic dosimeter films, the stability of NBT-PVB films was tested by measuring the absorbance of NBT film containing 10 mM NBT dye up to 60 days after irradiation. The films were irradiated to 10, 20 and 30 kGy and kept under normal laboratory conditions in the dark. A set of three films was used for each irradiation dose. The optical density of the irradiated NBT-PVB films were measured every 24 hours using UV/VIS spectrophotometer for 60 days after irradiation. The variations in absorbance of the irradiated films were normalized with respect to that of the first day after irradiation. The results show limited change (less than ±3%; 1σ) in the specific absorbance of the film up to 60 days (see Table 7 and FIG. 10 (a, b and c)) indicating that this film has a potential for commercial application as Radio-chromic film dosimeters.

TABLE 7

Absorbance of NBT-PVB film with storage time.

| | Absorbance (a.u.) | | |
|---|---|---|---|
| Days | 10 kGy | 20 kGy | 30 kGy |
| 1 | 1 | 1 | 1 |
| 2 | 1.015856267 | 0.991317799 | 1.015768658 |
| 5 | 0.955271859 | 1.009759111 | 0.993736892 |
| 6 | 1.003104691 | 1.007035711 | 1.002223031 |
| 7 | 1.01758725 | 1.012482512 | 1.002196201 |
| 8 | 0.967157943 | 1.009292243 | 0.968439457 |
| 9 | 1.005124171 | 1.031857561 | 1.005542361 |
| 12 | 1.033631155 | 1.032168807 | 0.992050396 |
| 13 | 0.967157943 | 1.015672781 | 0.96667247 |
| 14 | 0.948751823 | 1.012482512 | 0.9818241 |
| 15 | 0.942808781 | 0.993418708 | 0.976845105 |
| 16 | 0.955271859 | 1.009914734 | 0.961612983 |
| 19 | 0.942520284 | 0.998243018 | 0.976845105 |
| 21 | 0.967013694 | 1.026332949 | 0.985264168 |
| 23 | 0.991507105 | 1.05442288 | 0.993683231 |
| 26 | 0.985564063 | 1.021353017 | 0.978638923 |
| 28 | 0.985564063 | 1.03286911 | 0.9785316 |
| 30 | 1.003970183 | 1.029990087 | 1.008969014 |
| 33 | 0.961214901 | 1.050486393 | 1.01838603 |
| 38 | 0.960205392 | 1.04171705 | 1.024877497 |
| 44 | 0.961503398 | 1.03089304 | 1.0185358 |
| 47 | 0.979332524 | 1.062090224 | 1.02627842 |
| 51 | 0.961503398 | 1.062497853 | 1.017129591 |
| 60 | 0.981012348 | 1.071101273 | 1.020276936 |

The effect of dose rate on the invented films was investigated using 1.25 MeV gamma-ray from $^{60}$Co source at a mean dose rate of 11.98 kGy/hour and an electron beam accelerator (SureBeam Corporation, USA) with energy of 10 MeV, mean dose rate of 15 kGy/second, relative humidity of 50% and at temperature of 25° C. for irradiation at absorbed doses of 10, 20, 30 and 40 kGy. Three dosimeters were used for each irradiation dose. It was found that there is no appreciable effect of dose rate on the irradiated films (see FIG. 11).

Although the present embodiments have been described with reference to specific example embodiments, it will be evident that various modifications and changes may be made to these embodiments without departing from the broader spirit and scope of the various embodiments. Accordingly, the specification and examples are to be regarded in a descriptive rather than a restrictive sense.

What is claimed:

1. A method of manufacturing a dosimeter film, comprising:

dissolving Nitro Blue Tetrazolium salt in ethanol at a concentration of 8-12 mM thereof to form a first dye solution;

stirring the formed first dye solution at room temperature for 3 hours to ensure homogeneity thereof;

dissolving polyvinyl butyral (PVB) powder in 2-methoxyethanol at 45° C. in a ratio of 9 gms of PVB powder to 110 ml of 2-methoxyethanol to form a second solution;

magnetically stifling the formed second solution at 45° C. for 4 hours followed by cooling thereof to room temperature;

dissolving a portion of the stirred first dye solution in a portion of the magnetically stirred second solution to form a mixture;

pouring the formed mixture on a horizontal surface to form the dosimeter film;

drying the formed dosimeter film at room temperature for 72 hours; and storing the dried dosimeter film in a closed environment to protect the dried dosimeter film from a light exposure.

2. The method of claim 1, further comprising:

testing the dried dosimeter film in a humidity environment, wherein a relative humidity of the humidity environment is 12-75%.

3. The method of claim 1, further comprising:

exposing a sample of the dried dosimeter film to a radiation to measure an absorbed dose, wherein the radiation is at least one of electron beam radiation and gamma radiation; and measuring the absorbed dose as an intensity gradient in a photometer.

* * * * *